UNITED STATES PATENT OFFICE.

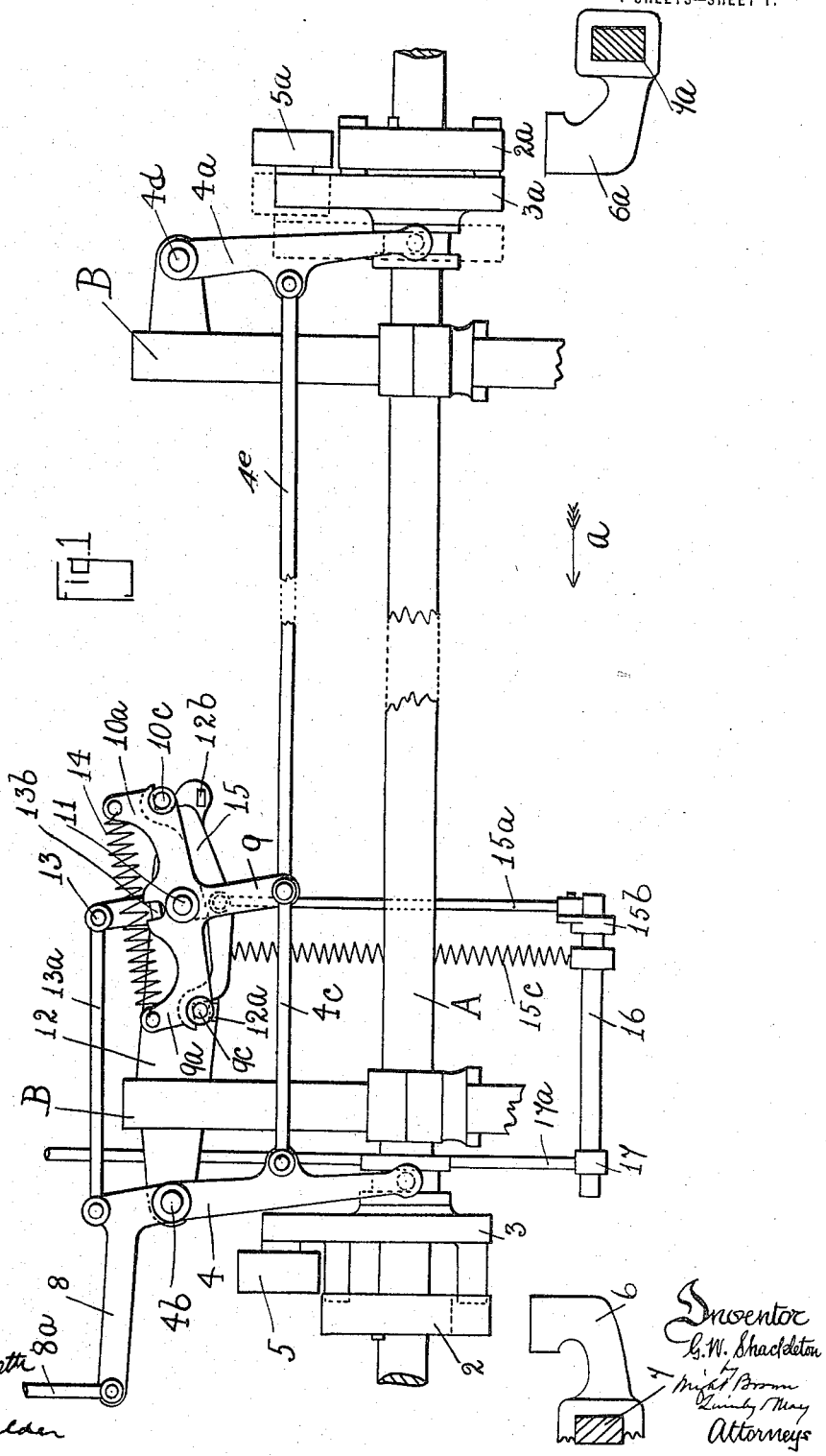

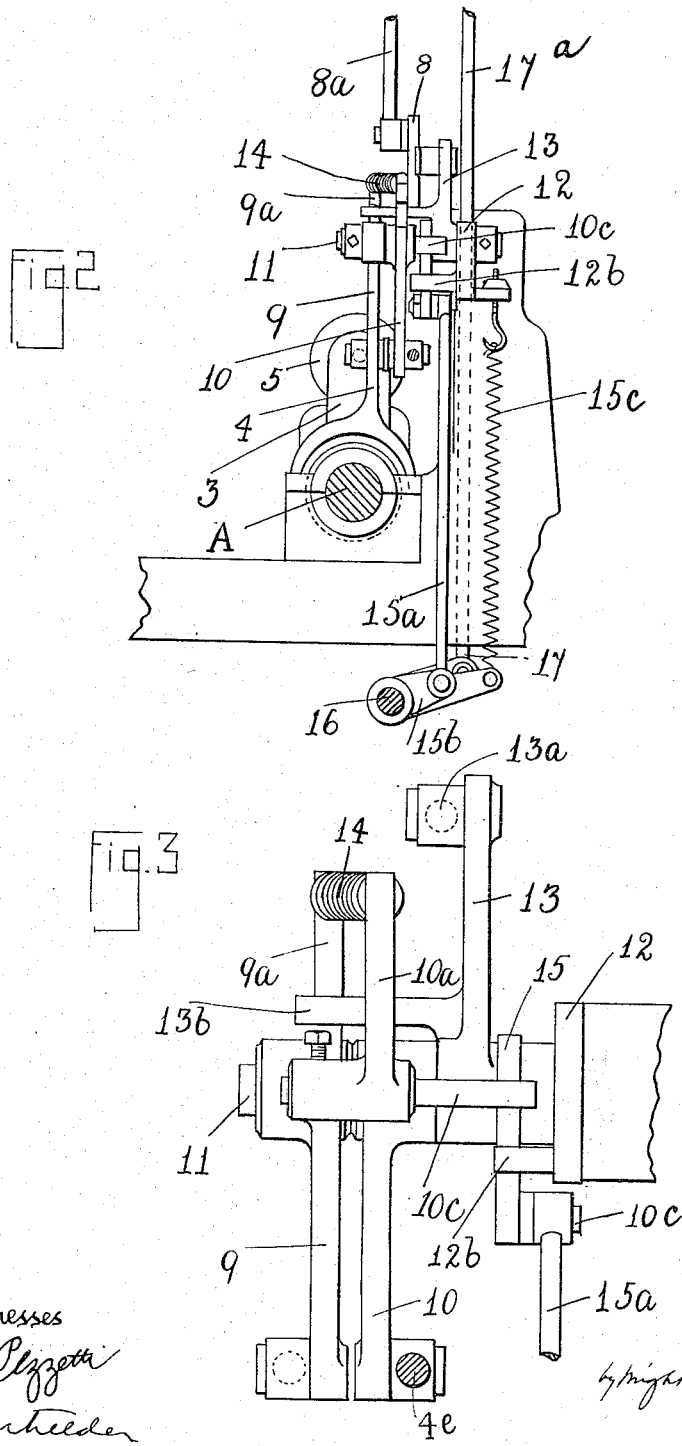

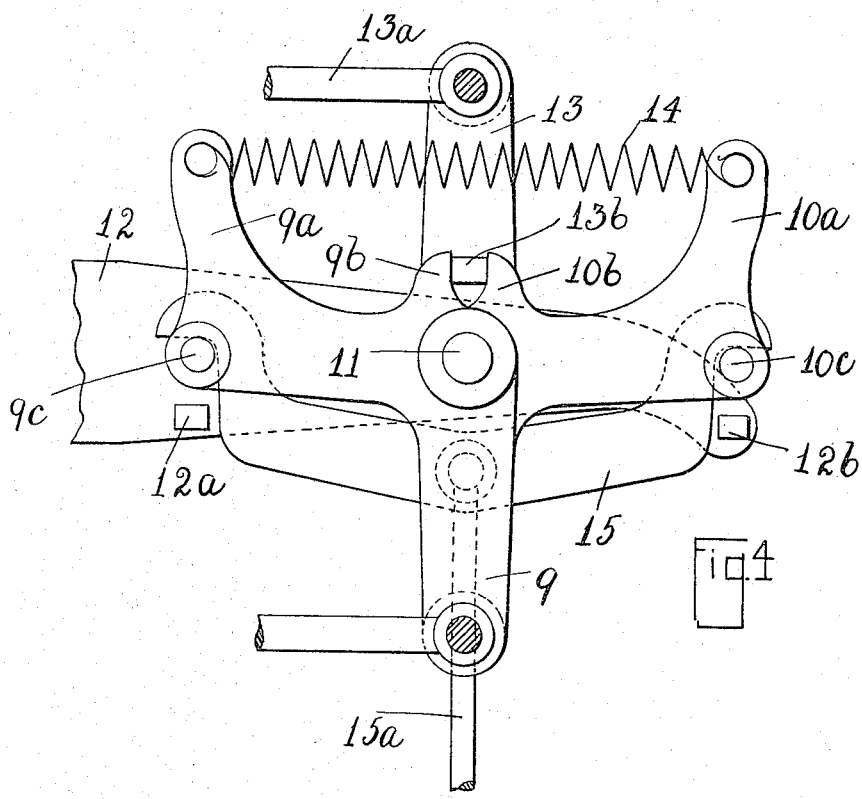
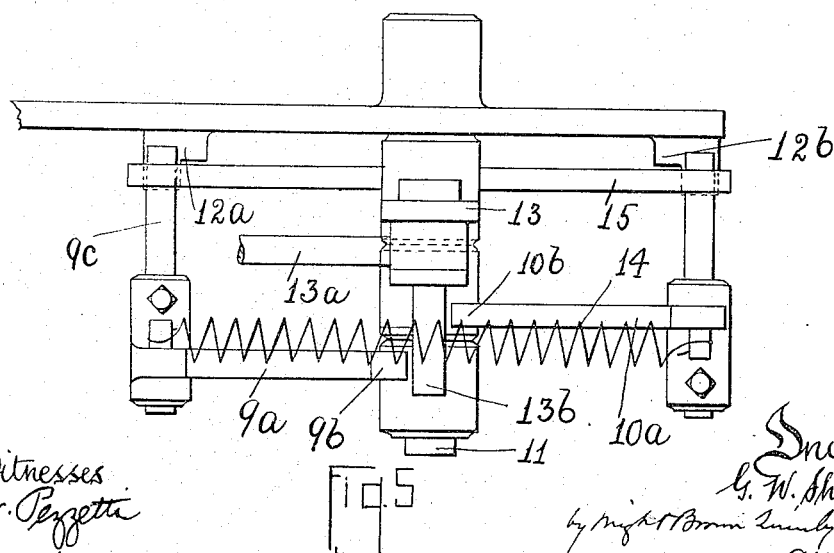

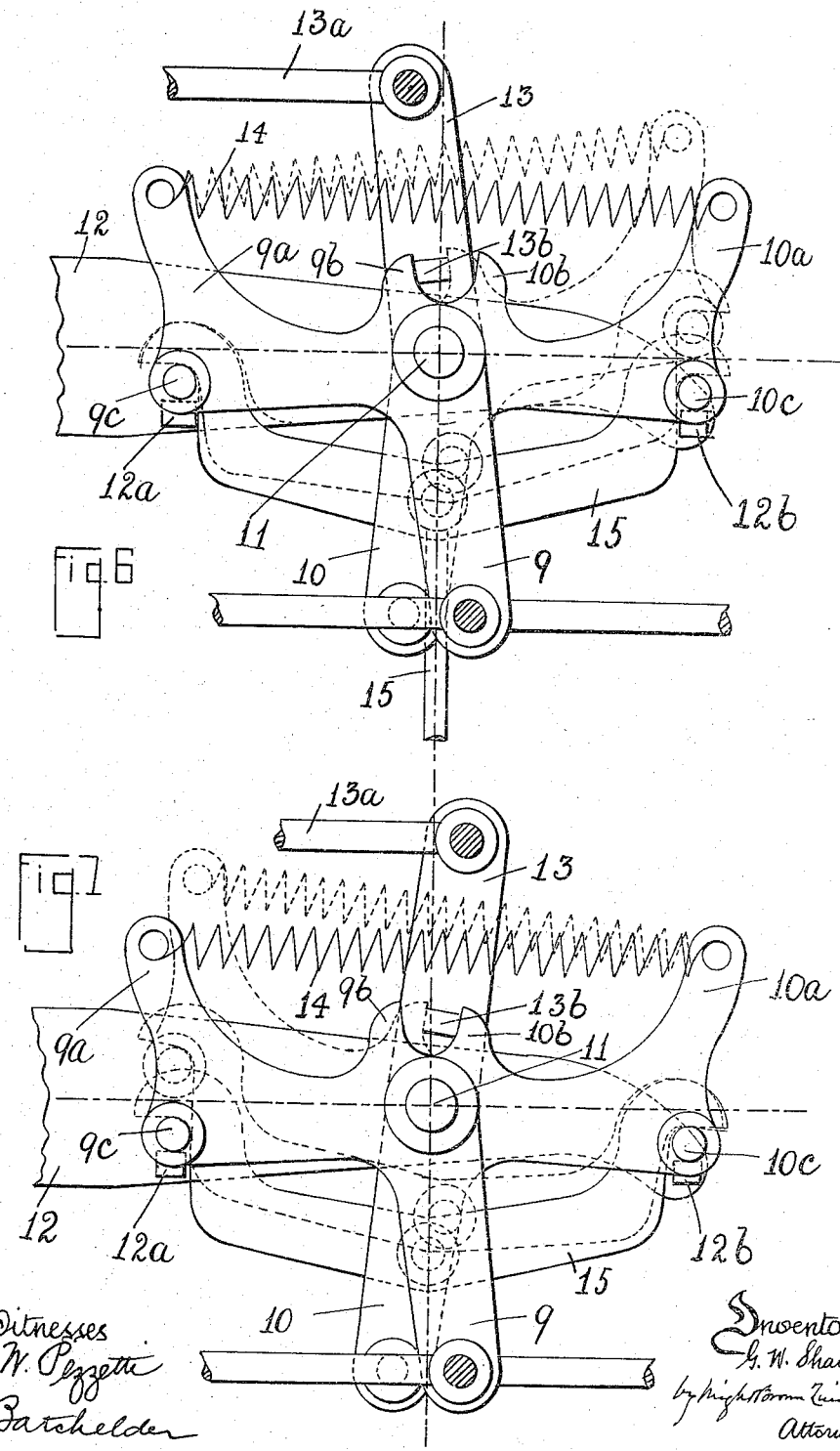

GEORGE WILSON SHACKLETON, OF BRAITHWAITE, KEIGHLEY, ENGLAND, ASSIGNOR TO GEORGE HATTERSLEY AND SONS, LIMITED, OF KEIGHLEY, ENGLAND, A FIRM.

PICKING OR SHUTTLE-ACTUATING MECHANISM FOR LOOMS.

1,164,129.     Specification of Letters Patent.     Patented Dec. 14, 1915.

Application filed September 19, 1913. Serial No. 790,624.

*To all whom it may concern:*

Be it known that I, GEORGE WILSON SHACKLETON, a subject of the King of Great Britain, and resident of Braithwaite, Keighley, in the county of York, England, have invented a certain new and useful Improvement Appertaining to Picking or Shuttle-Actuating Mechanism for Looms, of which the following description, having reference to the accompanying sheets of drawings, is a specification.

It relates to the type or class of picking or shuttle actuating mechanism for looms wherein it is necessary that the actions of said mechanism should from time to time be entirely suspended or arrested, such for example, as in looms having series of shuttle boxes and other devices that necessitate a reversal in the direction of motion of certain of their mechanisms when performing what is known as "lagging-back" or other operations, and my said invention has more especial reference to that type or class of picking mechanism which is to be put into and out of action by the sliding of clutches which engage and disengage certain of the operating parts in manner well known.

My invention consists in a novel arrangement of lever and other devices which are so constructed that provided the picking clutch on one or other side is in gear (at which time the clutch on the opposite side of the loom is out of gear as is well understood) the movement of a handle by the weaver or attendant (or the movement of a lever by mechanism such as is used for automatically finding the last or broken pick or shot of weft) will throw said clutch out of gear without disturbing the other clutch and that in a manner which is efficient for this purpose, as well as for operating the clutch mechanism to carry out the usual changes in the functions of the picking cams during the ordinary weaving operations of the loom.

In the accompanying sheets of drawings which are illustrative of my invention: Figure 1 is a front elevation showing the low shaft or that shaft of a loom upon which the picking cams or clutches operating the picking bowls are mounted, my said apparatus being shown arranged in connection therewith. Fig. 2 is an end elevation of the parts shown to the left of Fig. 1, and as seen in the direction indicated by the arrow *a*. Fig. 3 is a similar view to Fig. 2 but illustrates my improved parts alone, the same being drawn to an enlarged scale. Fig. 4 shows my improved parts as detached from the loom and as seen from the front of said loom. Fig. 5 is a plan showing the parts illustrated by Fig. 4. Figs. 6 and 7 are similar views to Fig. 4 but illustrate certain of the parts in the positions they assume under the conditions hereinafter described.

A is the low shaft or picking shaft of a loom, and B B show the cross rails of said loom which afford support for said shaft A. Upon the shaft A are keyed or fixed the clutches 2, $2^a$ into which slide the other parts of the clutches 3, $3^a$, said clutches 3 and $3^a$ being arranged to be moved longitudinally upon the shaft A by means of the fork levers 4, $4^a$ so that when said clutches 3 and $3^a$ are in certain positions they will carry their bowls or cam actuators 5 and $5^a$ to actuate their respective picking cams 6, $6^a$, upon the picking shafts 7 and $7^a$ in manner well understood. The levers 4 and $4^a$ are usually connected together by a connecting rod extending between them in order that a lever 8 (which is actuated by a rod $8^a$ to be moved according to the indications of the pattern surface of the loom) may be made to actuate the lever 4 and therefore also the lever $4^a$. According to my invention I make the lever 8 separate from the lever 4 and mount it loosely upon the stud $4^b$ upon which is also mounted loosely said lever 4, while the connecting rod $4^c$ instead of reaching to the lever $4^a$ (which lever $4^a$ is pivoted upon its stud $4^d$) is connected to a lever 9 constructed and arranged in accordance with my invention. The rod $4^e$ which is pivotally connected to the lever $4^a$ is connected to a lever 10 and said levers 9 and 10 are levers constructed and arranged in accordance with my invention. The levers 9 and 10 are mounted loosely upon their stud 11 which is carried by being fixed to the bracket 12, which is fixed to the cross rail B. Mounted loosely also upon the pivotal stud 11 is the lever 13, which by the rod $13^a$ is connected to the lever 8 thus as said lever 8 is operated through its rod $8^a$ by the pattern surface mechanism so also is the lever 13. The levers 9 and 10 have arms $9^a$ and $10^a$ respectively which project beyond their pivotal stud 11, so that they may be connected together by a retracting spring 14, which draws them toward each other or tends to draw them toward each other to keep the lower arms 9 and 10 in normal positions. Extending beyond the same center 11 of the levers 9 and 10 are projections $9^b$ and $10^b$ respectively and these are of such a shape that when the levers are free to be actuated by their spring 14, said arms $9^b$ and $10^b$ are brought against a projection $13^b$ which extends laterally from the lever 13, thus provided the spring 14 is not distended, whenever the lever 13 is oscillated on one side or the other of its vertical center, so will the lower arms of the levers 9 and 10 be oscillated from side to side as will be understood.

The lever arms $9^a$ and $10^a$ have hubs formed upon them so that projecting pins $9^c$ and $10^c$ may be fixed within said hubs and made to project laterally therefrom, as shown by Fig. 5. These pins $9^c$ and $10^c$ are sufficiently long to extend over projections $12^a$ and $12^b$ which extend laterally from the bracket 12, thus the downward movement of the pins $9^c$ and $10^c$ is arrested by said projections $12^a$ and $12^b$ as hereinafter explained. Taking over, and with its extending ends resting upon said pins $9^c$ and $10^c$, is the lever 15 connected to which is a vertical rod $15^a$ which rod $15^a$ reaches to be connected to a lever $15^b$ mounted upon a horizontal shaft 16, which by the lever 17 is oscillated, through the rod $17^a$ by mechanism under the control of the weaver (or otherwise) as when automatic pick finding mechanism is employed, which has to be actuated whenever the picking motion has to be thrown out of gear. The weight of the lever 15 its rod $15^a$ and the lever $15^b$ is counteracted by the spring $15^c$.

The actions of these parts are as follows:—During the ordinary weaving operations of the loom the lever 15 lightly presses or rests upon the pins $9^c$ and $10^c$ and therefore the spring 14 is enabled by being strong enough to press said levers with their projecting arms $9^b$ and $10^b$ against the laterally projecting arm $13^b$ of the lever 13. In this manner as the lever 13 is oscillated by means of the pattern surface mechanism through the lever 8 and rod $8^a$ above referred to, said levers 9 and 10 are oscillated. In one position, as in the position shown by Figs. 1, 6 and 7, the lever 9 has withdrawn the lever 4 so that the picking clutch 3 brings away the picking bowl 5 out of the path of motion of the cam 6, while at the same time the lever 10 being in the opposite position to the lever 9 (as is shown in Figs. 1 and 6) the clutch $3^a$ and consequently the bowl $5^a$ are brought into the path of the cam $6^a$. When the lever 13 is moved to the opposite side of its vertical center (as shown by Fig. 7) the positions of the bowls 5 and $5^a$ are reversed, that is to say, the bowl 5 is then brought into position for actuating the cam 6, while the bowl $5^a$ is brought out of the position for actuating the cam $6^a$.

When for any reason, such as during the process of lagging back or otherwise, it is desired that both of the bowls 5 and $5^a$ should be out of position for actuating their cams 6 and $6^a$, then the shaft 16 is actuated by the lever 17 through the rod $17^a$ (which as is hereinbefore stated, is moved either by the weaver with proper or appropriate handle devices, or which is connected to cam or other mechanism automatically actuated during the time of lagging back, and which mechanism is well known as automatic pick finding mechanism) so that by the lever $15^b$ secured to said shaft 16, the rod $15^a$ is caused to descend and pull down the lever 15. The descent of the lever 15 is limited by the stop pieces $12^a$ and $12^b$ arresting the pins $9^c$ and $10^c$ as above described, so that provided the lever 13 is in the position shown by Figs. 1 and 6 (in which case the pick finding bowl 5 is already out of the path of motion of the cam 6) on the descent of said lever 15 which forces down the pin $10^c$ and brings with it the arm $10^a$ against the retracting actions of the spring 14, the arm 10 is moved to cause the rod $4^e$ to withdraw the bowl $5^a$ from the path in which its cam $6^a$ lies. On the other hand, provided the lever 13 is in the position to the opposite side of its center as is shown by Fig. 7, in which position it has caused the lever 10 to withdraw the bowl $5^a$ from being in the path of its cam $6^a$, on said lever 15 being caused to descend its opposite end will bring down the pin $9^c$ to rest upon the stop piece $12^a$ as shown by Fig. 7, hence the lever 9 is at this time moved into the position also shown by Fig. 7, to withdraw the bowl 5 from the path in which it moves to actuate the cam 6. The respective positions from which the levers 9 and 10 are moved by the lever 15 are shown in broken lines in said Figs. 6 and 7.

By the employment of lever devices according to my said invention and as hereinbefore described, the disengaging of the picking mechanism is readily effected without disturbing any of the pattern surfaces or other mechanism of the loom, and when the reëngagement of the picking mechanism is effected all the parts of the loom are thus enabled to retain their proper respective positions to continue their effective operations as will be understood.

Such being the nature and object of my said invention, what I claim is:—

1. In a loom, the combination with picking mechanism having two slidable actuators, of means for sliding said actuators to and from actuating position, said means including a main lever arranged so as normally to be operated by suitable pattern surface mechanism, two supplemental levers in permanent axial alinement with said main lever, means for normally holding said supplemental levers in position to be operated by said main lever, means connecting each of said supplemental levers with one of said actuators respectively; said supplemental levers, holding means and connecting means being arranged so as normally to slide one actuator out of actuating position while sliding the other actuator into actuating position; and a fourth lever operable to move both said actuators out of actuating position simultaneously.

2. In a loom, the combination with picking mechanism having two slidable actuators, of means for sliding said actuators to and from actuating position, said means including a main lever arranged so as normally to be operated by suitable pattern surface mechanism, two supplemental levers in permanent axial alinement with said main lever, holding means for normally holding said supplemental levers in position to be operated by said main lever, means connecting each of said supplemental levers with one of said actuators respectively; said supplemental levers, holding means and connecting means being arranged so as normally to slide one actuator out of actuating position while sliding the other actuator into actuating position; and a fourth lever operable to withdraw either of said actuators from actuating position when the other actuator is out of actuating position.

3. In a loom, the combination with picking mechanism having two slidable actuators, of means for sliding said actuators to and from actuating position, said means including a main lever arranged so as normally to be operated by suitable pattern surface mechanism, two supplemental levers in permanent axial alinement with said main lever, holding means for normally holding said supplemental levers in position to be operated by said main lever, means connecting each of said supplemental levers with one of said actuators respectively; said supplemental levers, holding means and connecting means being arranged so as normally to slide one actuator out of actuating position while sliding the other actuator into actuating position; and a fourth lever mounted on laterally projecting portions of said supplemental levers and operable to cause said supplemental levers to withdraw both said actuators from actuating position.

4. In a loom, the combination with picking mechanism having two slidable actuators, of means for sliding said actuators to and from actuating position, said means including a main lever arranged so as normally to be operated by suitable pattern surface mechanism, two supplemental levers in permanent axial alinement with said main lever, holding means for normally holding said supplemental levers in position to be operated by said main lever, means connecting each of said supplemental levers with one of said actuators respectively; said supplemental levers, holding means and connecting means being arranged so as normally to slide one actuator out of actuating position while sliding the other actuator into actuating position; and a fourth lever mounted on laterally projecting portions of said supplemental levers and operable to cause said supplemental levers to withdraw either of said actuators from actuating position when the other actuator is out of actuating position.

5. In a loom, the combination with picking mechanism having two slidable actuators, of means for sliding said actuators to and from actuating position, said means including a main lever arranged so as normally to be operated by suitable pattern surface mechanism, two supplemental levers in permanent axial alinement with said main lever and having laterally projecting portions, holding means for normally holding said supplemental levers in position to be operated by said main lever, means connecting each of said supplemental levers with one of said actuators respectively; said supplemental levers, holding means and connecting means being arranged so as normally to slide one actuator out of actuating position while sliding the other actuator into actuating position; and a fourth lever mounted on said laterally projecting portions of said supplemental levers and operable to withdraw either of said actuators from actuating position when the other actuator is out of actuating position, and fixed abutting means arranged to engage said laterally projecting portions of said supplemental levers to limit the retraction of said actuators to a predetermined distance.

6. In a loom, the combination with picking mechanism having two slidable actuators, of means for sliding said actuators to and from actuating position, said means including a main lever having a lateral projection and arranged so as normally to be operated by suitable pattern surface mechanism, two supplemental levers in permanent axial alinement with said main lever, said supplemental levers having abutment portions adapted to abut against the lateral projection on said main lever, means for normally holding said abutment portions of the supplemental levers in engagement with the lateral projection on said main lever, means connecting each of said supplemental levers with one of said actuators, respectively, pins extending laterally from each of said supplemental levers, a fourth lever mounted on said pins and operable to depress said pins to withdraw both said actuators from actuating position simultaneously, and fixed abutting means arranged to engage said pins to limit the retraction of said actuators to a predetermined distance.

7. In a loom, the combination with picking mechanism having two slidable actuators, of means for sliding said actuators to and from actuating position, said means including a main lever having a lateral projection and arranged so as normally to be operated by suitable pattern surface mechanism, two supplemental levers in permanent axial alinement with said main lever, said supplemental levers having portions adapted to abut against the lateral projection on said main lever, means for normally holding said abutting portions of the supplemental levers in engagement with the lateral projection on said main lever, means connecting each of said supplemental levers with one of said actuators respectively, pins extending laterally from each of said supplemental levers, a fourth lever mounted on said pins and operable to depress said pins to withdraw either of said actuators from actuating position while the other actuator is out of actuating position, and fixed abutting means arranged to engage said pins to limit the retraction of said actuators to a predetermined distance.

8. In a loom, the combination with picking mechanism having two slidable actuators, of a bracket affixed to the loom and provided with a stud and abutments, a main lever mounted to oscillate on said stud and normally operable by suitable pattern mechanism, two supplemental levers mounted to oscillate on said stud, said main lever having a lateral projection and said supplemental levers having abutments adapted to engage said projection, mechanism connecting each of said supplemental levers with one of said actuators respectively, a spring connecting said supplemental levers and arranged to keep said abutments on said supplemental levers normally in contact with said projection on said main lever whereby movement is imparted to said supplemental levers to move said actuators respectively and simultaneously out of and into actuating position, pins projecting laterally from said supplemental levers, a fourth lever mounted on said pins, and means for operating said fourth lever to depress said pins into contact with the abutments on said bracket to restrain both said actuators at predetermined points from assuming actuating position.

In testimony whereof I have signed my name to this specification in the presence of two subscribing witnesses.

GEORGE WILSON SHACKLETON.

Witnesses:
SAMUEL HEY,
JOHN WHITEHEAD.

Copies of this patent may be obtained for five cents each, by addressing the "Commissioner of Patents, Washington, D. C."